United States Patent
Swenson

(10) Patent No.: US 9,062,733 B2
(45) Date of Patent: Jun. 23, 2015

(54) GAS SPRING OIL RESERVOIR

(75) Inventor: Ryan Lee Swenson, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 226 days.

(21) Appl. No.: 13/428,097

(22) Filed: Mar. 23, 2012

(65) Prior Publication Data
US 2013/0249151 A1 Sep. 26, 2013

(51) Int. Cl.
*F16F 9/36* (2006.01)
*F16F 9/02* (2006.01)

(52) U.S. Cl.
CPC ......... *F16F 9/0218* (2013.01); *Y10T 29/49609* (2015.01); *F16F 9/365* (2013.01)

(58) Field of Classification Search
CPC ....... F16F 9/365; F16F 9/067; F16F 2230/30; F16J 15/40
USPC ....................... 267/118, 124, 129; 188/322.17
See application file for complete search history.

(56) References Cited

U.S. PATENT DOCUMENTS

| 4,108,423 A | * | 8/1978 | Skubal | 267/64.15 |
| 5,086,691 A | * | 2/1992 | von Hatten | 92/83 |
| 2011/0042173 A1 | * | 2/2011 | Abreu et al. | 188/315 |

FOREIGN PATENT DOCUMENTS

| DE | 3702581 A | * | 8/1988 |
| GB | 1510699 A | * | 5/1978 |

* cited by examiner

*Primary Examiner* — Anna Momper
(74) *Attorney, Agent, or Firm* — Sue C. Watson

(57) ABSTRACT

A gas spring includes a housing having an end configured to receive a rod therethrough, the rod extending to a piston movably positionable within the housing. A spacer separates a pair of sealing devices and forming a compartment containing oil that is positioned near the end of the housing, the compartment having a first portion and a second portion. The first portion is defined by the sealing devices, the spacer and the rod. The second portion is defined by the sealing devices, the spacer and the housing. The first portion is in fluid communication with the second portion permitting circulation of oil therebetween.

6 Claims, 2 Drawing Sheets

GAS SPRING OIL RESERVOIR

FIELD OF THE INVENTION

The present invention relates generally to the field of gas springs. It relates more particularly to gas springs using oil during operation.

BACKGROUND OF THE INVENTION

Gas springs are often used in applications that reduce the forces required to move an object, such as doors or panels which rotate about a horizontal axis when raised and would otherwise require a lifting force due to gravity acting on the door or panel. Gas springs contain a pressurized gas acting on a piston positioned inside of the housing of the gas spring. A rod connected to the piston variably extends exterior of the housing in response to the force generated by the pressurized gas against the piston. An amount of oil is contained within the housing between the piston and the end of the housing through which the rod extends to help maintain a seal between the rod and the housing to prevent escape of the pressurized gas. However, in order to maintain the seal, it is a generally accepted practice to utilize the gas spring in a "rod-down" position, in order for the seal to remain in contact with the oil to maintain the seal. Fully damped gas springs containing significantly more oil may be used to address this issue, but are significantly more costly.

Accordingly, it would be desirable to have an inexpensive gas spring that could be mounted in any orientation, while maintaining the seal in contact with oil.

SUMMARY OF THE INVENTION

The present invention relates to a gas spring including a housing having an end configured to receive a rod therethrough, the rod connected to a piston movably positionable within the housing. A pair of sealing devices and a spacer separate the sealing devices and form a compartment containing oil near the end of the housing, the compartment having a first portion and a second portion. The first portion is defined by the sealing devices, the spacer and the rod. The second portion is defined by the sealing devices, the spacer and the housing. The first portion is in fluid communication with the second portion permitting circulation of oil therebetween.

The present invention further relates to a method for assembling a gas spring including providing a housing having an open end and a closed end. The method further includes inserting a piston connected to a rod inside of the open end, the piston movably positionable between the open end and the closed end. The method further includes positioning a spacer between a pair of sealing devices inside the open end, the spacer and the pair of sealing devices defining a compartment having a first portion and a second portion. The first portion is defined by the sealing devices, the spacer and the rod. The second portion is defined by the sealing devices, the spacer and the housing. The first portion is in fluid communication with the second portion. The method further includes introducing an amount of oil in at least one of the first portion and the second portion and securing the compartment near the open end of the housing. The method further includes introducing pressurized gas inside the housing between the piston and the closed end of the housing.

An advantage of the present invention is the ability to operate the gas spring in any orientation, while maintaining the seal in contact with oil, thereby improving the operation and useful life of the seal.

Another advantage of the present invention is the ability to circulate the oil between two chamber portions, providing improved heat dissipation capabilities.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
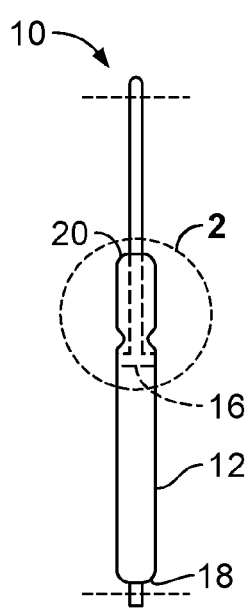
FIG. 1 shows a side view of an exemplary embodiment of a gas spring of the present disclosure.

Referring to the drawings, FIG. 1 shows a gas spring 10 including a housing 12 having opposed ends 18, 20. End 20 is configured to receive a rod 14 connected to a piston 16 that is movably positionable within housing 12 between opposed ends 18, 20 by a pressurized gas (not shown) that is contained within housing 12.

Figure 2:
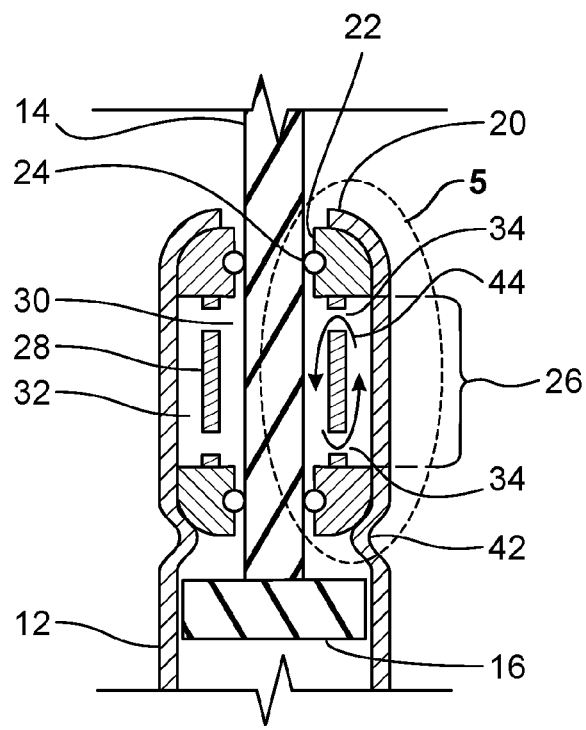
FIG. 2 shows an enlarged partial view of an end of the gas spring taken from region 2 of FIG. 1 of the present disclosure.

As shown in FIG. 2, which is taken from region 2 of FIG. 1, a spacer 28 is positioned between and separating a pair of sealing devices 24. Sealing devices 24 include retention members 22. In one embodiment, the sealing devices 24 and retention members 22 are integrally formed, or stated another way, may be of unitary construction. As shown in FIG. 2, sealing devices 24 are packings, also referred to as O-rings that are secured in corresponding annular slots formed in retention members 22. During operation of gas spring 10, sealing devices 24 are sized to accommodate sliding contact with the outer surface of rod 14, while also maintaining a fluid tight seal therebetween to prevent the escape of pressurized gas from housing 12. Additionally, by virtue of the sliding fluid tight seal formed between sealing devices 24 and the outer surface of rod 14, the outer surface of rod 14 is "wiped clean" and substantially prevents introduction of contaminants, such as dirt particles, inside housing 12 of gas spring 10 while maintaining the fluid tight seal.

As further shown in FIG. 2, an assembled gas spring 10 includes a compartment 26 having a first portion 30 and a second portion 32. A suitable lubricating liquid, such as an oil (not shown) may be introduced into at least one of first portion 30 and second portion 32. In one embodiment, oil substantially fills each of first portion 30 and second portion 32. First portion 30 is defined by the outer surface of rod 14, retention members 22 of sealing devices 24, and an inner surface of spacer 28. Second portion 32 is defined by an outer surface of spacer 28, retention members 22 of sealing devices 24, and an inner surface of housing 12. In other words, spacer 28 separates first portion 30 from second portion 32. As further shown in FIG. 2, first portion 30 and second portion 32 are in fluid communication with each other by virtue of openings 34 formed in spacer 28. As a result of openings 34, oil is maintained in contact with both the outer surface of rod 14 and sealing devices 24, which provides several benefits. The oil provides for smoother operation of gas spring 10 by reducing friction between the outer surface of rod 14 and sealing devices 24, which also results in extending the service life of the gas spring 10. Additionally, by maintaining oil between the outer surface of rod 14 and sealing devices 24, depending on the application, the rate at which pressurized gas permeates the seal and escapes is slowed, also extending the service life of the gas spring 10. Further, by virtue of the first and second portions 30, 32 maintaining oil in contact with the outer surface of rod 14 and sealing devices 24 irrespective of the orientation of the gas spring 10, gas spring 10 is not limited to a "rod-down" orientation. Finally, by virtue of first and second portions 30, 32 permitting circulation 44 by virtue of openings formed in spacer 28, the amount of thermal energy that may be removed during operation of the gas spring is increased.

As further shown in FIG. 2, upon assembly, housing 12 secures compartment 26. That is, a constriction 42 is formed in the housing 12 to secure one retention member 22 of sealing device 24, and the end 20 is also deformed, such as by cramping to secure the opposed retention member 22 of sealing device 24. In another embodiment, the compartment may be secured near, but not necessarily at the end of the housing, permitting multiple compartments to be constructed and secured, if desired. As used herein, the term secure indicates that a fluid tight seal is formed between the facing surfaces of the elements being brought together.

Figure 5:
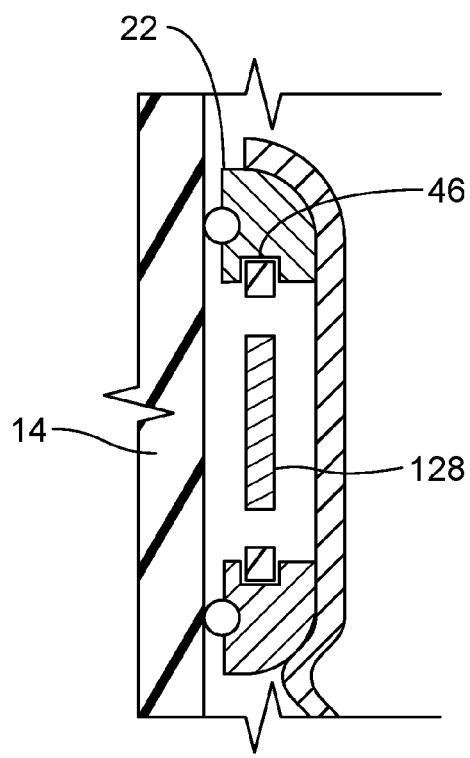
FIG. 5 shows an enlarged partial view taken from region 5 of FIG. 2 of an exemplary embodiment of the gas spring of the present disclosure.
Figure 3:
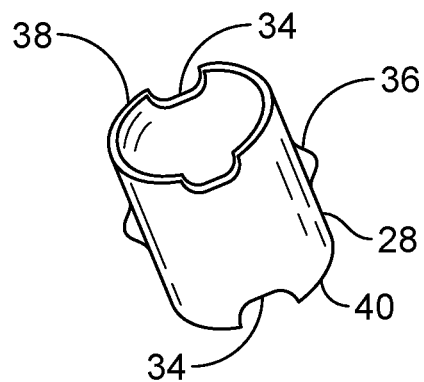
FIG. 3 shows an exemplary embodiment of a spacer of a gas spring of the present disclosure.

As shown in FIG. 3 spacer 28 includes a pair of corresponding openings 34, such as slots or slotted openings formed in each of opposed ends 38, 40 of spacer 28. In order to secure spacer 28 in a substantially centered position within housing 12, spacer 28 includes a positioning feature 36, such as a pair of opposed protrusions extending outwardly from spacer 28. Such protrusions perform the function of substantially centering spacer 28, while maximizing the volume of second portion 32 (FIG. 2), and permitting recirculation 44 between first portion 30 and second portion 32. Positioning feature 36 may include other embodiments. For example, as shown in FIG. 5, spacer 128 may be centered by forming a recess 46, such as an annular groove in retention member 22 of sealing device 24.

Figure 4:
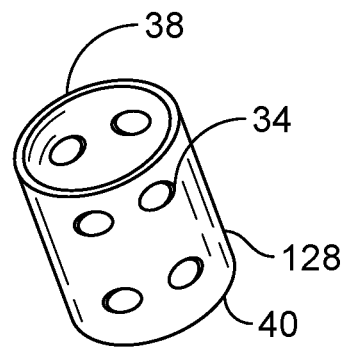
FIG. 4 shows an exemplary embodiment of a spacer of a gas spring of the present disclosure.

FIG. 4 shows an alternate embodiment of spacer 128 including openings 34 formed near opposed ends 38, 40. In another embodiment, the spacer may include a single opening.

Figure 6:
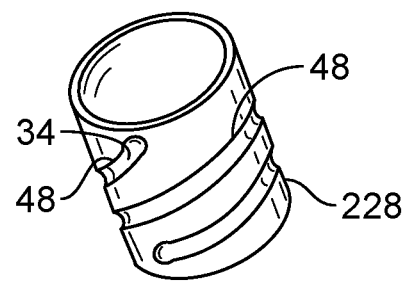
FIG. 6 shows an exemplary embodiment of a spacer of a gas spring of the present disclosure.

FIG. 6 shows a further alternate embodiment of spacer 228, in which passageways 48 formed in one or both surfaces of spacer 288 may extend in a predetermined path, such as a spiral direction between openings 34 in order to enhance the amount of recirculation of the oil. In another embodiment, the passageway may not terminate at the openings.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas spring comprising:
    a housing having an end configured to receive a rod therethrough, the rod connected to a piston movably positionable within the housing;
    a pair of sealing devices; and
    a pair of retention members; and
    one spacer separating the sealing devices and forming a compartment containing oil, the spacer including a cylindrical outer surface and having opposing open ends defined by an opening formed therethrough which forms an inner surface, the compartment positioned near the end of the housing, the compartment having a first portion and a second portion;
    the first portion defining a first space is defined by the sealing devices, the spacer and the rod, the second portion defining a second space is defined by the sealing devices, the spacer and the housing, the first portion and the second portion formed to extend about the spacer, the first portion and the second portion including oil which circulates about opposing ends, the inner surface and the outer surface of the spacer within the compartment,
    wherein the spacer is spaced away from the rod and away from the housing via the oil in the compartment so that the spacer does not contact the rod, and
    wherein the spacer only contacts the pair of retention members at two points via positioning features of the spacer to permit circulation of oil about the spacer.

2. The gas spring of claim 1, wherein the positioning features of the spacer are provided on the outer surface thereof which permit centering of the spacer within the housing at two points to enhance circulation of oil about the spacer.

3. The gas spring of claim 1, wherein the pair of sealing devices includes a positioning feature for positioning the spacer.

4. The gas spring of claim 3, wherein the positioning feature is a recess.

5. The gas spring of claim 3, wherein the positioning feature is an annular groove.

6. The gas spring of claim 2, wherein the positioning features include two protrusions extending outwardly from the outer surface of the spacer.

* * * * *